United States Patent
Harris

(10) Patent No.: US 7,784,050 B2
(45) Date of Patent: Aug. 24, 2010

(54) TEMPERATURE MANAGEMENT SYSTEM FOR A MULTIPLE CORE CHIP

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 702 days.

(21) Appl. No.: 11/371,062

(22) Filed: Mar. 9, 2006

(65) Prior Publication Data
US 2009/0099705 A1    Apr. 16, 2009

(51) Int. Cl.
*H01L 29/72* (2006.01)
(52) U.S. Cl. .......... 718/100; 700/300; 702/60; 706/4; 62/155; 264/40.6
(58) Field of Classification Search ........... 718/100; 702/60; 700/300; 706/4; 62/155; 264/40.6
See application file for complete search history.

(56) References Cited

U.S. PATENT DOCUMENTS

| | | | | |
|---|---|---|---|---|
| 4,689,965 | A * | 9/1987 | Janke et al. | 62/155 |
| 2006/0070073 | A1 * | 3/2006 | Maeda et al. | 718/100 |
| 2006/0241880 | A1 * | 10/2006 | Forth et al. | 702/60 |

* cited by examiner

*Primary Examiner*—Edward Wojciechowicz
(74) *Attorney, Agent, or Firm*—The Law Office of Scott C. Harris, Inc.

(57) ABSTRACT

A multiple unit processing system which processes tasks using a plurality of different processing units. Each of the processing units is individually monitor for temperature. A new task is assigned to the processing units based on their level of sale, based on their temperature, and based on the rate of change of temperature. In this way, the temperature of the multiple units can be managed based on the assignment of different tasks.

14 Claims, 1 Drawing Sheet

TEMPERATURE MANAGEMENT SYSTEM FOR A MULTIPLE CORE CHIP

BACKGROUND

As semiconductor processing reaches its limits, it becomes more difficult to get more performance from complicated processing circuits, such as microprocessors. Instead of making more complicated chips, it has been suggested to put multiple processing cores on a single chip. Therefore, rather than providing one processor which can operate more quickly, the processing tasks would be allocated among multiple cores on a single chip.

For example, by putting four cores on a chip, a suitably written program, that is one whose instructions can be executed independent of one another, could execute the program four times as fast.

A single chip could have 4, 16, 256, or any number of cores thereon. Each of the cores can be a relatively simple processor, but the large number of these cores enables computations of various types can be carried out more quickly.

Other systems may provide multiple cores on different substrates.

The tasks for the multiple cores are allocated between the cores. Typically, either one of the cores operates to allocate the tasks, or a separate dedicated device, either on or off chip, allocates those tasks. The work is divided up to make sure that all cores always have enough work to keep them busy.

SUMMARY

The present application teaches management of temperature in a processing system that divides the work to be done among multiple processing parts.

One aspect allocates work between the processing parts, based at least partly on temperature considerations.

DETAILED DESCRIPTION

Figure 1:
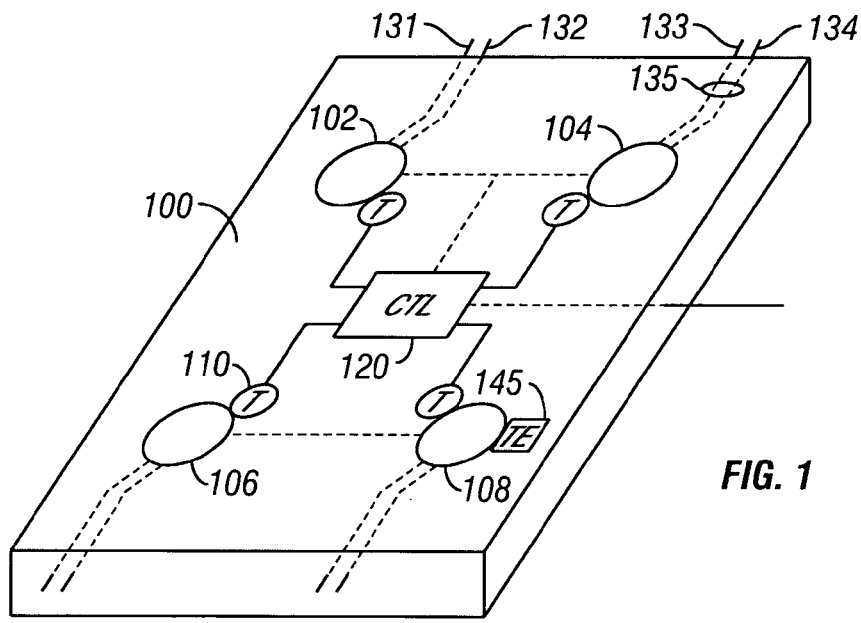
FIG. 1 shows a block diagram of a chip with multiple processing parts.

FIG. 1 shows an embodiment. A substrate 100 includes a plurality of processing parts, in the embodiment, called cores 102, 104, 106, 108 thereon. While this shows an embodiment with four cores, it should be understood that this is applicable to any number of cores, specifically $2^N$, where n is any number between 1 and 25.

In another embodiment, different cores may be located on different substrates.

Each of the cores may include an associated temperature sensor shown as 110 to sense the temperature on core 106. The other cores include analogous temperature sensors. In the embodiment, the temperature sensors may be thermocouples, but any type of semiconductor or infrared based temperature sensors can alternatively be used.

A controller 120 carries out the allocation of tasks in this embodiment. The controller may alternatively be embodied by one of the cores, or can be an off chip controller. In addition, the controller 120 may include or interface with very high speed, on-chip memory, also known as cache memory. The cache memory may store information about the tasks that the different processors are to carry out.

In prior multiprocessor systems, the multiprocessing controller has the function of making sure that each of the multiple processing cores has an adequate supply of work. For example, it is most efficient if each of the processing cores are always processing information. Therefore, controller may maintain a queue of work for each of the processor cores.

In this embodiment, however, it is recognized that the kinds of tasks that will be carried out by these cores may consume the different amounts of power, and may produce different amounts of heat. While some processor cores may be more busy than others, it may be desirable to balance the heat load between the processor cores in order to maintain a constant heating effect.

In the FIG. 1 embodiment, cooling may be preferentially provided to the area of the cores. However, maintaining a constant temperature may be beneficial.

For example, for any specific application that is running, a statistical model of what percentage of the cores will be operating or not operating may be made. If a program is highly parallelizable, most of the cores may be operating. However, there will inevitably always be times when no core can do anything until certain processes, operating on other cores, have already completed. The cores will cool during the times when the cores are idle. The cooling of those cores can be statistically managed, so that the total amount of cooling for the chip can take into account the total amount of idle time, and can allocate the tasks including temperature as a variable thereof.

Figure 2:
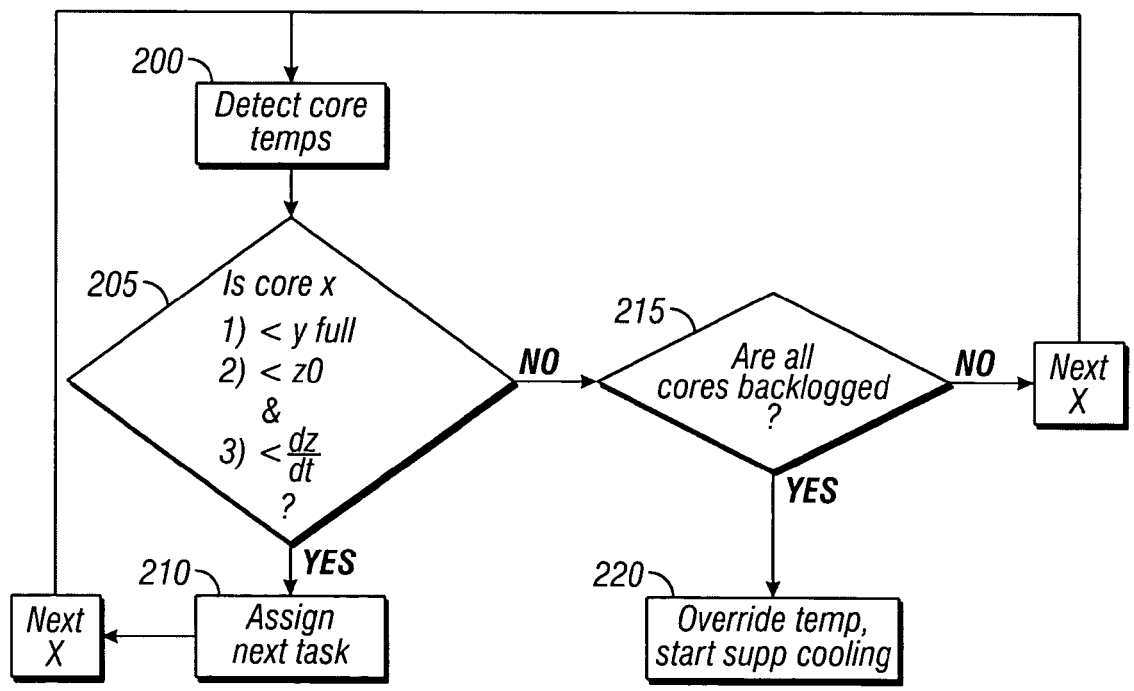
FIG. 2 shows a flowchart of operation.

The process may also follow the flow chart shown in FIG. 2. At 200, the controller 120 detects all the core temperatures. This may be done using for example the thermocouples 110. As an alternative, the controller 120 may model the temperature. A first model may monitor power consumption of the cores. In the embodiment shown, the different cores, such as 102, each have separate power terminals. For example, core 102 is fed by power terminals 131 and 132, while core 104 is fed by power terminals 133 and 134. As an alternative way of estimating the heat, the controller 120 may monitor instantaneous current on the specific lines to the controller. For example, this may use a Hall effect sensor shown as 135. The controller can integrate the current over time, and maintain a value that represents an estimation of the temperature of the core based on average dissipation and power consumption. Other techniques may include infra red detection, or the like. By whatever means, the core temperature is obtained at 200.

At 205, a determination of whether a specific core should receive a task assigned to it is made. For each of the multiple cores, here are referred to as the variable CORE_X, 205 detects whether the cache for the CORE_X is less than y % full. 205 also detects if the core is greater than z degrees, where z may be considered as the temperature beyond which the core should not be normally operated. 205 can also consider whether the change in temperature, these dz/dt is greater than a certain amount, which might represent that the temperature of the core is raising the temperature more quickly than desirable.

If all values of the core are okay at 205, the next task is assigned to the core at 210, and control then passes back to detect the next core_X and assign the next value. If any of the values of the core are not acceptable at 205, then a "backlog" is established at 205, for the core X. This would normally prevent further tasks from being assigned to core X.

215 tests to see if all the cores are currently backlogged based on temperature. That is, are each of the cores too hot, or increasing in temperature too quickly. If so, then the temperature backlog is temporarily overridden at 220, and supplemental cooling may be instituted at 220. A supplemental cooling system may be a cooling system that is not suitable for continuous use, for example, a thermoelectric cooler such as shown in 145. A thermoelectric cooler may be separate from the chip or part of the chip. Thermoelectric coolers are extremely inefficient in power consumption and also produce large amounts of ambient heat in areas other than the cooled areas. This may require that heating part of the thermoelectric cooler be properly piped. However, the thermoelectric coolers may be most suitable for use intermittently, without these extra concerns.

The thermoelectric cooler 145 may be turned on at 220.

The amount of supplemental cooling may also be selected. For example, the thermoelectric cooler 145 may be pulse width modulated in order to change the amount of supplemental cooling that it provides to any of the cores.

In another embodiment, the thermoelectric coolers are used any time any core gets hotter then a certain level, and its dz/dt begins increasing by more than a certain amount. The degree of cooling by the thermoelectric cooler may be proportional to the dz/dt.

The use of coolers which are not suitable for continuous use in a processor system may be used, for example, only when the processor is in times of high number crunching loads. The coolers can be located one near each core, to provide spot cooling of the different cores. Alternatively, a single cooler may be provided for all of the different cores. For example, certain actions such as program start, or computer start, may be extremely power intensive, and the non-continuous coolers may be intermittently used during these times only.

Other types of intermittent cooling may also be used.

According to another technique of estimating temperature and maintaining a value indicative of probable temperature within a table, the controller maintains a table of probable temperature increase for each of a plurality of tasks. Each time a task is completed by a core, the controller adds a temperature increase to the table, related to that task. Each unit time, the controller subtracts a certain value related to a probable amount of cooling in that unit time.

The controller may also attempt to randomize the tasks, so that each core maintains a constant temperature.

According to an alternative embodiment, the tasks are assigned based on relative temperatures of the units, rather than stopping the assignment only when the units are too hot. For example, the tasks could do automatically be assigned to the lowest temperature unit, or could be assigned to the lowest temperature unit that has a specified amount of fill for example.

Even when the systems are modeled, it may be useful to include one or more actual temperature sensors, which senses an ambient temperature within the computer case or near the chip for example.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other coolers may be used, and other hardware may be cooled using this system and method.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical or a semiconductor memory, a removable disk or other removable medium. The programs may also be run over a network, for example, with a server or other machine sending signals to the local machine, which allows the local machine to carry out the operations described herein.

What is claimed is:

1. A method, comprising:
    using a processor for determining a plurality of tasks for a plurality of processing units that are collectively processing in a machine;
    using the processor for determining information related to temperatures of said plurality of processing units;
    using the processor for determining an assignment for said plurality of tasks to the plurality of processing units, based on said temperatures; and
    determining an overheating condition for at least one core, and preventing assigning a task to said at least one core in said overheating condition;
    controlling an intermittently-used cooler to cool processing units; and
    responsive to said controlling an intermittently-used cooler, allowing assigning a task to said at least one core during said controlling an intermittently-used cooler.

2. A method as in claim 1, wherein said determining an assignment comprises determining a temperature of all processing units, and using said intermittently used cooler only when all processing units have a temperature greater than a predetermined amount.

3. A method as in claim 2, wherein said determining a temperature comprises maintaining a value indicative of a probable temperature in a memory, and changing said value each time that a temperature-effecting condition occurs.

4. A method as in claim 2, wherein said modeling comprises determining a temperature of all processing units, and using said used cooler only when all processing units have a temperature greater than a predetermined amount.

5. A method, comprising:
    using a processor for determining a plurality of tasks for a plurality of processing units that are collectively processing in a machine;
    using the processor for determining information related to temperatures of said plurality of processing units; and
    using the processor for assigning said plurality of tasks to the plurality of processing units, based on said temperatures, wherein said assigning comprises determining a temperature of a specified processing unit, and also determining a rate of change of temperature of each of the processing units, and determining whether to assign said new task based on both said temperature and also on said rate of change of temperature for each of said processing units using both said temperature and said rate of change to determine whether to assign said task to said each said processing unit.

6. A method as in claim 5, wherein said the determining a temperature comprises sensing a temperature using a temperature sensor.

7. A method, comprising:
using a processor for determining a plurality of tasks for a plurality of processing units that are collectively processing in a machine;
using the processor for determining information related to temperatures of said plurality of processing units; and
using the processor determining an assignment for said plurality of tasks to the plurality of processing units, based on said temperatures, wherein said determining an assignment comprises determining a temperature of a specified processing unit, and determining whether to assign a new task to said processing unit based on said temperature,
wherein said determining a temperature comprises maintaining a value indicative of a modeled temperature in a memory, and changing said value each time that a temperature-effecting condition occurs, wherein said temperature effecting condition comprises detecting instantaneous power consumption of each of the processing units and using said instantaneous power consumption to increase the modeled temperature, and using an indication of dissipation over time to decrease the modeled temperature.

8. A method as in claim 7 further comprising controlling an intermittently-used cooler to cool individual processing units based on said modeled temperature only when all processing units have a modeled temperature greater than a predetermined amount, and not using said cooler when any of said individual processing units have a modeled temperature that is less than said predetermined amount.

9. A method as in claim 7, wherein said instantaneous power consumption is detected using a current sensor.

10. A method, comprising:
using a processor for evaluating a model to create a value related to a modeled temperature of each of a plurality of separate processing units, by determining a temperature effecting condition for each of said separate processing units that causes said temperature to increase, and using said temperature effecting condition to increase said modeled temperature and by periodically reducing said value by an amount related to ambient cooling; and
using said value indicative of modeled temperature to control actuating individual coolers that individually cause cooling of each of said plurality of separate processing units, where at least one of said individual coolers specifically cools one of each separate processing units.

11. A method as in claim 10, wherein said operation includes determining processing tasks to assign to each of said separate processing units based on said temperature.

12. A method as in claim 10, wherein each of said separate processing units are on a single semiconductor substrate.

13. A method as in claim 10, wherein said temperature effecting condition comprises instantaneous power consumption.

14. A method as in claim 10, wherein said temperature effecting condition comprises a type of task which has been assigned to a specific processing unit, and a probable temperature increase for said specific type of task.

* * * * *